(12) United States Patent
Hsia et al.

(10) Patent No.: US 9,162,159 B2
(45) Date of Patent: Oct. 20, 2015

(54) WATER VAPOR COLLECTION BOTTLES

(71) Applicants: Chih-Yu Hsia, Arcadia, CA (US); Michael Jonathan Hsia, Arcadia, CA (US); Patricia Shirley Hsia, Arcadia, CA (US)

(72) Inventors: Chih-Yu Hsia, Arcadia, CA (US); Michael Jonathan Hsia, Arcadia, CA (US); Patricia Shirley Hsia, Arcadia, CA (US)

( * ) Notice: Subject to any disclaimer, the term of this patent is extended or adjusted under 35 U.S.C. 154(b) by 307 days.

(21) Appl. No.: 13/775,198

(22) Filed: Feb. 24, 2013

(65) Prior Publication Data
US 2014/0238836 A1 Aug. 28, 2014

(51) Int. Cl.
C02F 1/14 (2006.01)
B01D 5/00 (2006.01)

(52) U.S. Cl.
CPC ............... B01D 5/0018 (2013.01); C02F 1/14 (2013.01)

(58) Field of Classification Search
CPC ...... C02F 1/14; B01D 1/0005; B01D 1/0035; B01D 5/009; B01D 5/0018
USPC ......... 202/83, 185.1, 189, 190, 234; 159/903, 159/904
See application file for complete search history.

(56) References Cited

U.S. PATENT DOCUMENTS

| 6,001,222 | A  | * | 12/1999 | Klein | 202/234 |
| 6,663,750 | B1 | * | 12/2003 | Coon  | 202/234 |
| 7,654,103 | B2 | * | 2/2010  | Hsia  | 202/234 |
| 2013/0161180 | A1 | * | 6/2013 | Brown | 202/176 |

* cited by examiner

Primary Examiner — Jill Warden
Assistant Examiner — Joye L Woodard

(57) ABSTRACT

A water vapor collector bottle consists of a transparent cover, a top box, a water supplier, an optional insulator, an optional bottom cover, and a bottom box. The transparent cover allows sun rays to evaporate some water to the top box which confines and collect the vapor condensate. The condensates will drop into a container in the bottom box. A wind operated knocker and an insert to increase the water condensation surfaces are also introduced.

9 Claims, 23 Drawing Sheets

WATER VAPOR COLLECTION BOTTLES

CROSS-REFERENCE TO RELATED APPLICATIONS

Not Applicable.

BACKGROUND OF THE INVENTION

This invention relates to means to collect water vapors evaporated from a water surface.

Prior patent to Hsia (U.S. Pat. No. 7,654,103 B2) presented a freshwater collection system which comprises of a vapor collector field formed by vapor collectors which have floatable platforms with central holes and curved transparent roofs to collect water vapors which are evaporated by sun rays through the central holes and then condescend on the interior surfaces of the transparent roofs by sprinkled water which are supplied by pumps and sprinkler heads.

BRIEF SUMMARY OF THE INVENTION

Obtaining freshwater from seawater or the like can be done by reverse osmosis or evaporation/condensation processes. However, these processes take excessive amount energy and equipment. They produce relatively costly freshwater. The uses of sun rays as a means of energy were attempted. Hsia (U.S. Pat. No. 7,654,103 B2) suggested the use of sun rays to generate water vapors then to condensate them by sprinkled water. However, these processes are slow and relatively inefficient. Therefore, means to produce relatively inexpensive freshwater from salty water were sought.

The current invention will provide devices which will use sun rays to generate water vapors. The invented devices then use cool ambient water and other means to condensate the water vapors to create freshwater. The created freshwater will then be collected and conveyed away by available means such as those suggested by Hsia (U.S. Pat. No. 7,654,103 B2).

These and other objects and advantages of the invention, as well as the details of illustrative embodiments, will be more fully understood from the following specification and drawings.

BRIEF DESCRIPTIONS OF THE SEVERAL VIEWS OF THE DRAWING

FIG. 1 is an isometric view of the invented device. No hidden lines are shown. FIG. 1 also illustrates the uses of the invented device.

FIG. 2 is a cross-sectional view of the invented device shown in FIG. 1. No hidden lines are shown. FIG. 2 also illustrates the uses of the invented device.

Figure 3:
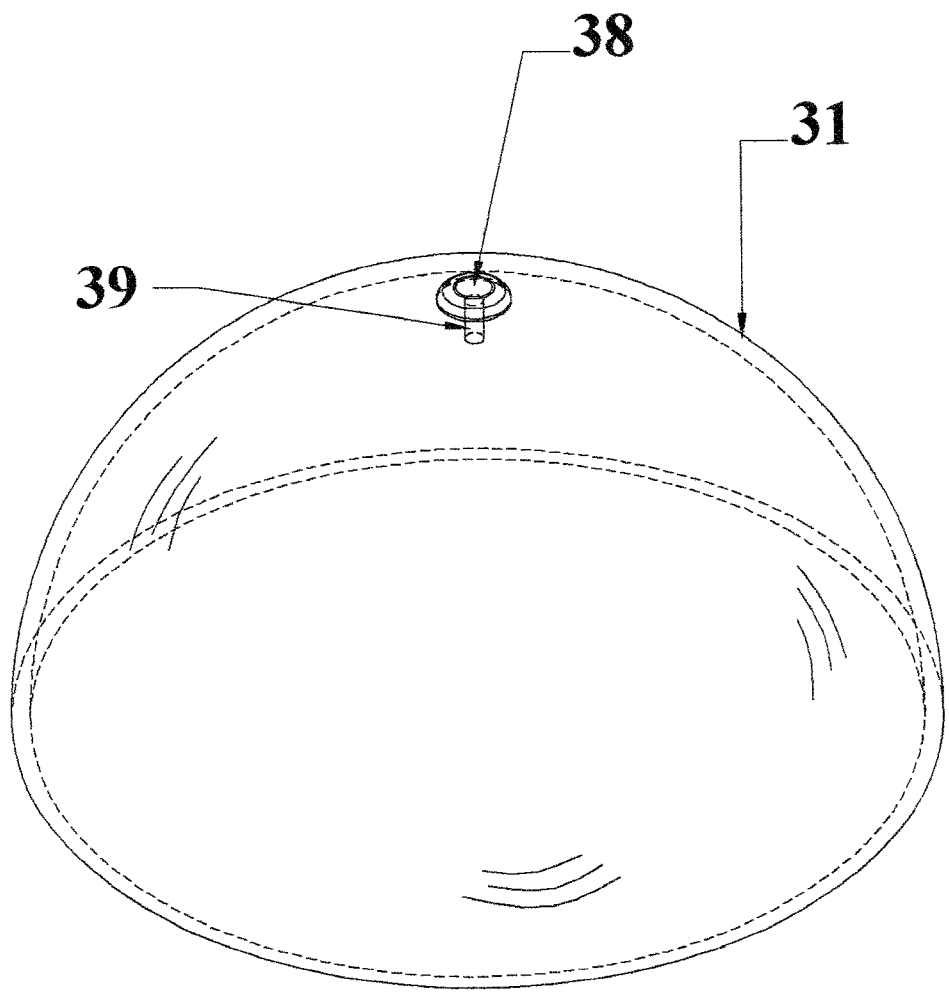
FIG. 3 is an isometric view of the transparent dome of the invented device shown in FIG. 1.
Figure 4:
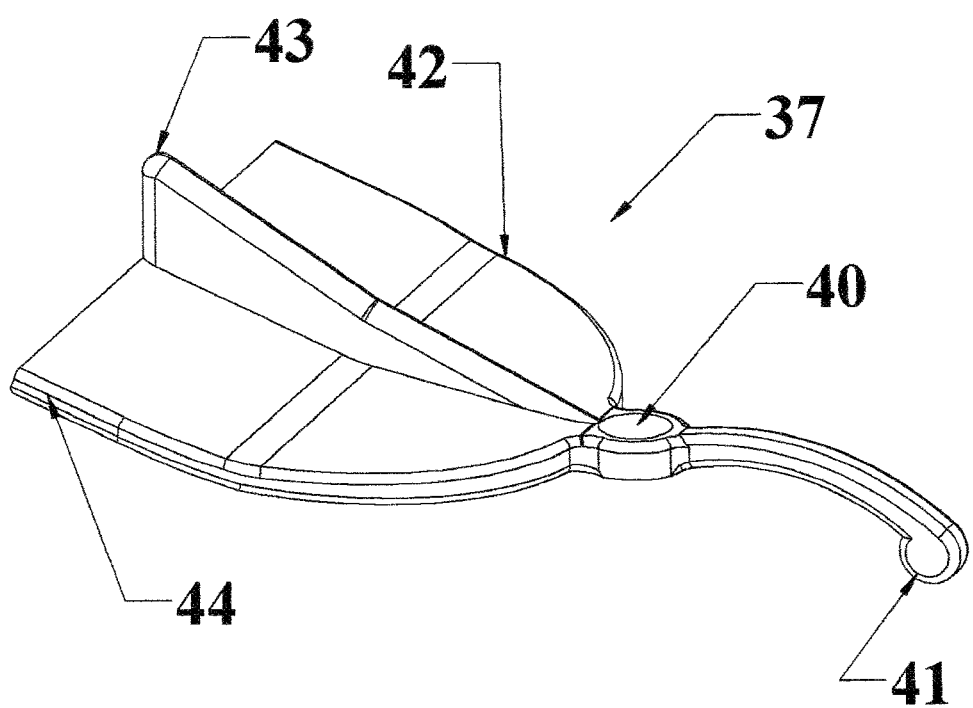
FIG. 4 is an isometric view of the knocker, a component of the invented device shown in FIG. 1. The hidden lines are not shown.
Figure 5:
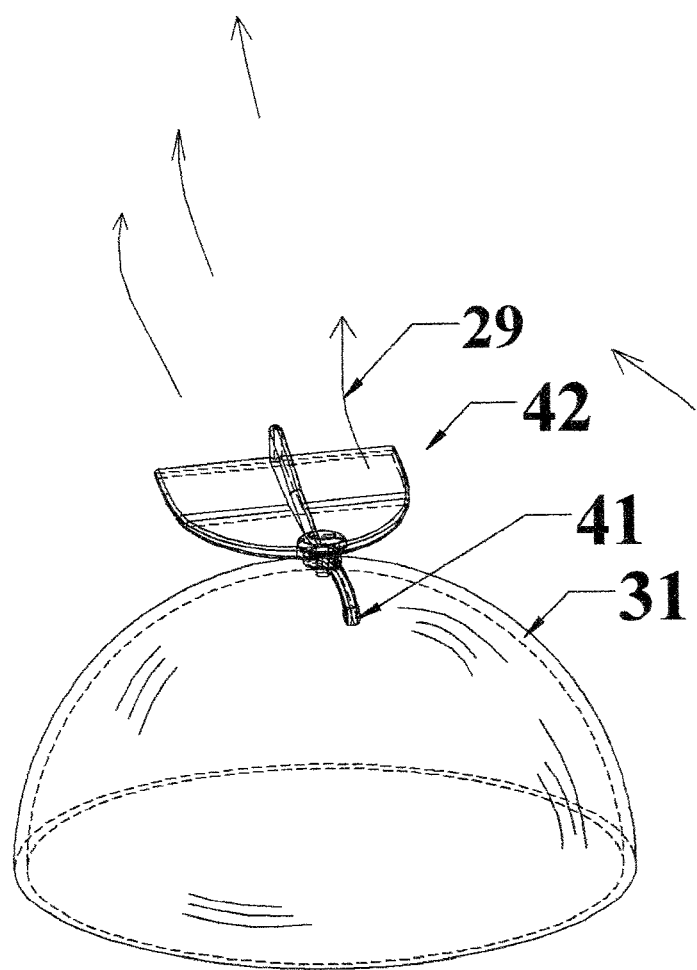

FIG. 5 is an isometric view of the transparent dome and the knocker shown in FIG. 3 and FIG. 4. FIG. 5 is used to illustrate the functions of these invented components. The hidden lines are not shown.

Figure 6:
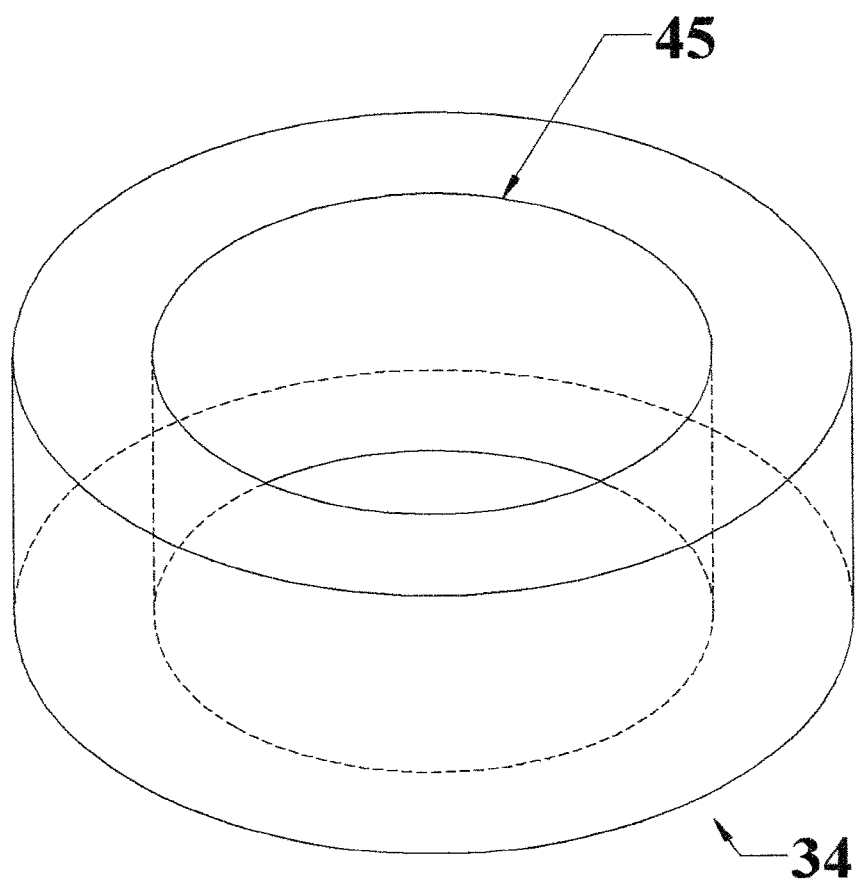

FIG. 6 is an isometric view of the insulator, a component of the invented device.

Figure 7:
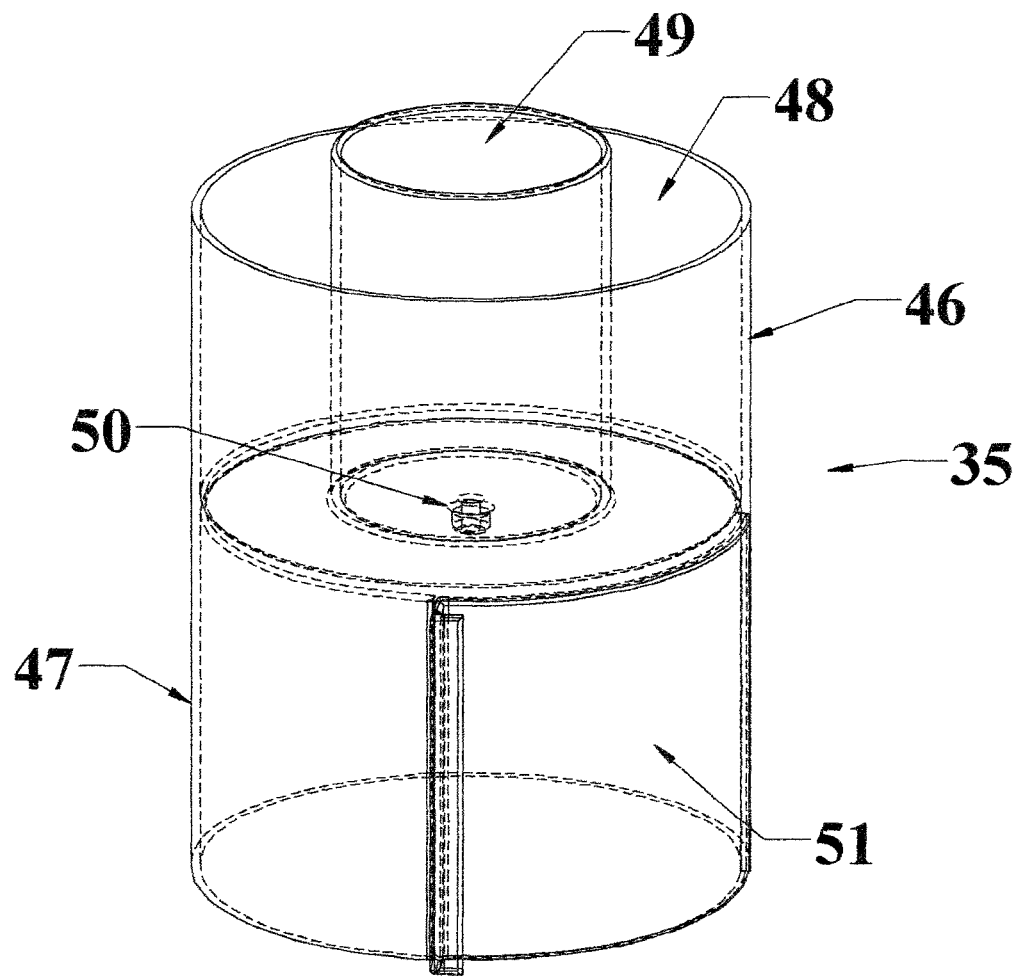

FIG. 7 is an isometric view of the bottom box, a component of the invented device.

Figure 8:
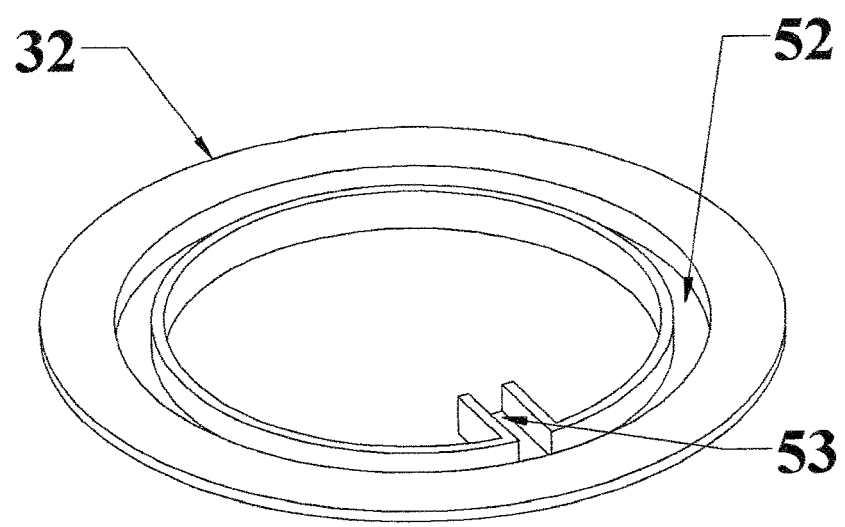

FIG. 8 is an isometric view of the dome water collector, a component of the invented device. The hidden lines are not shown.

Figure 9:
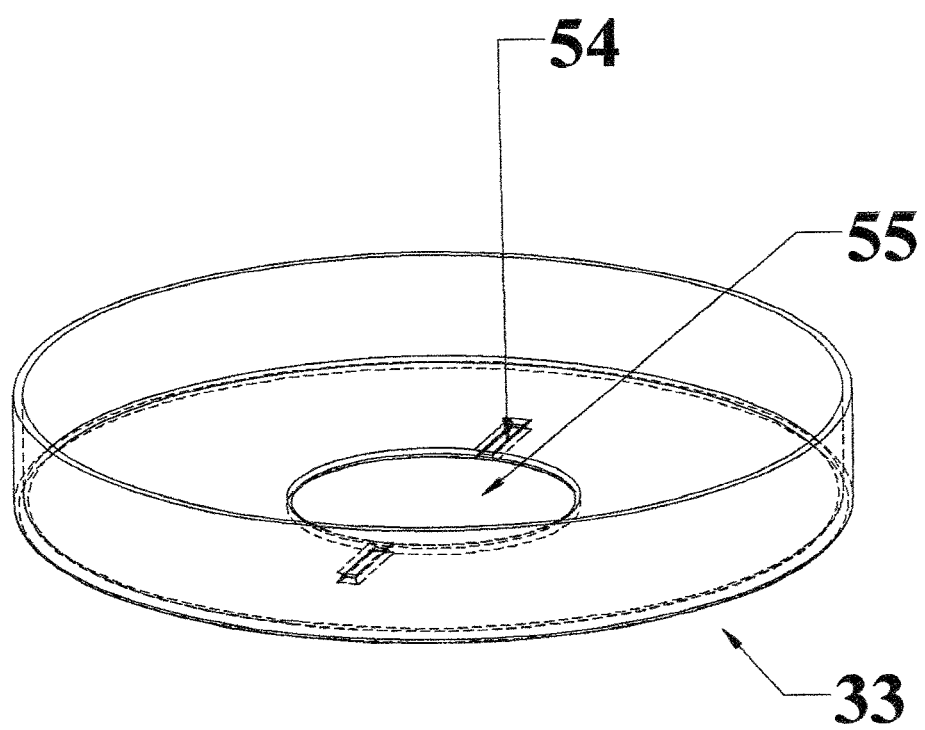

FIG. 9 is an isometric view of the top box, a component of the invented device.

Figure 10:
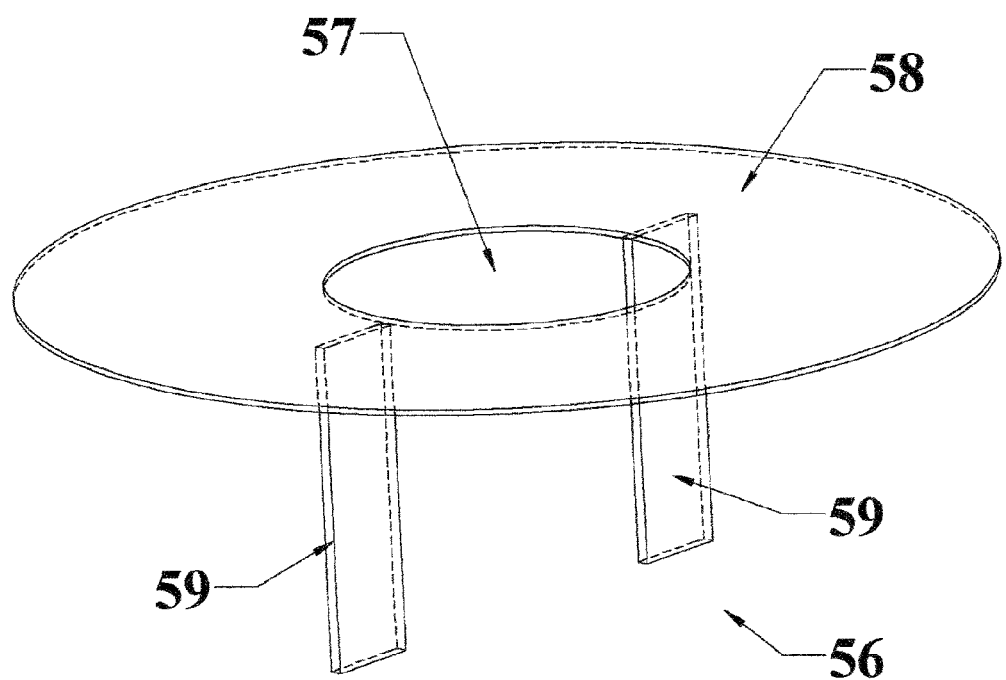

FIG. 10 is an isometric view of the water supplier, a component of the invented device.

Figure 11:
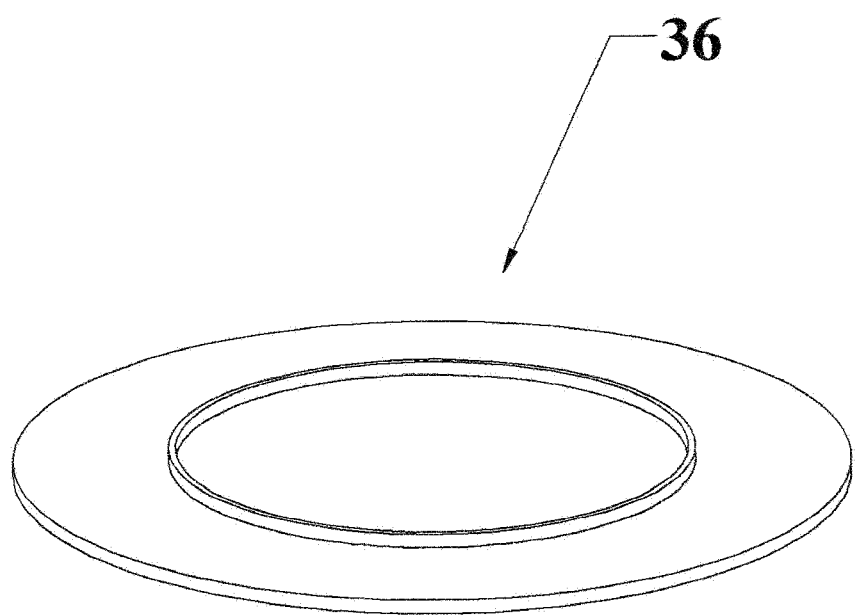

FIG. 11 is an isometric view of the bottom cover, a component of the invented device.

Figure 12:
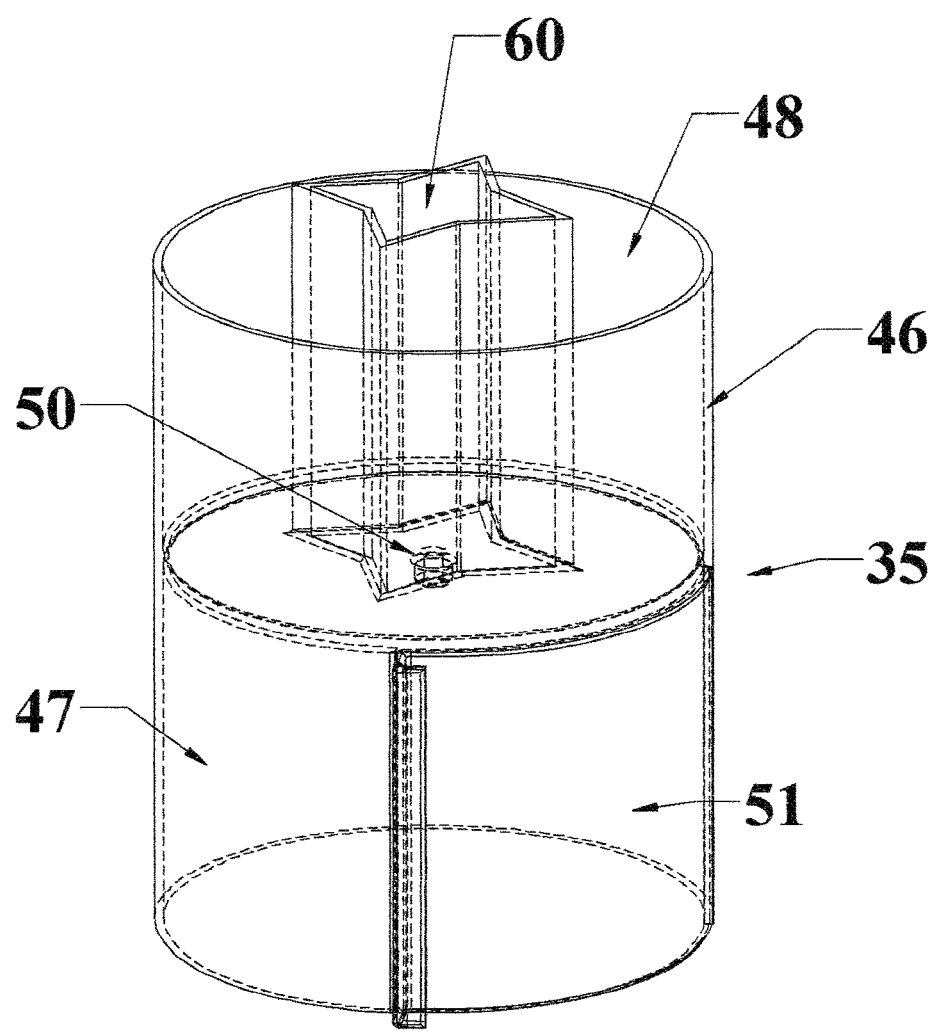

FIG. 12 is an isometric view of a variation of the bottom box, a component of the invented device.

Figure 13:
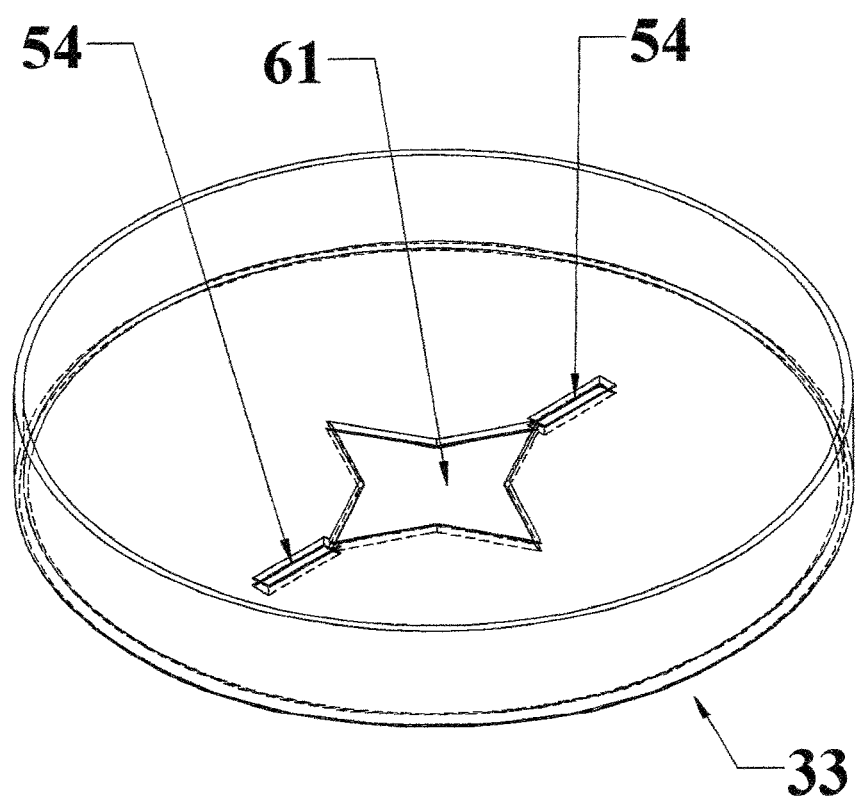

FIG. 13 is an isometric view of a variation of the top box, a component of the invented device.

Figure 14:
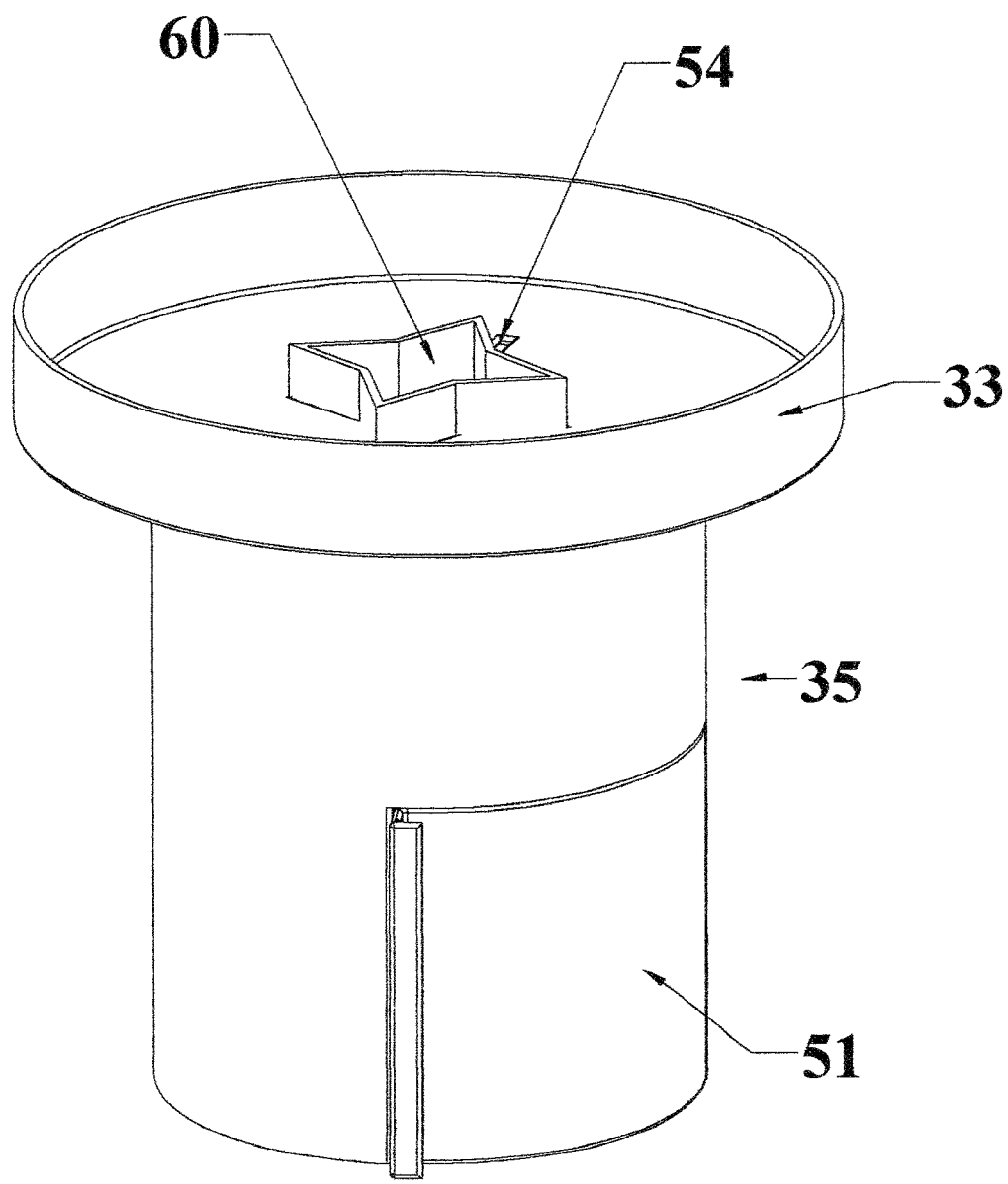

FIG. 14 is an assembled isometric view of a variation of the top box and the bottom box shown in FIG. 12 and FIG. 13. The hidden lines are not shown.

Figure 15:
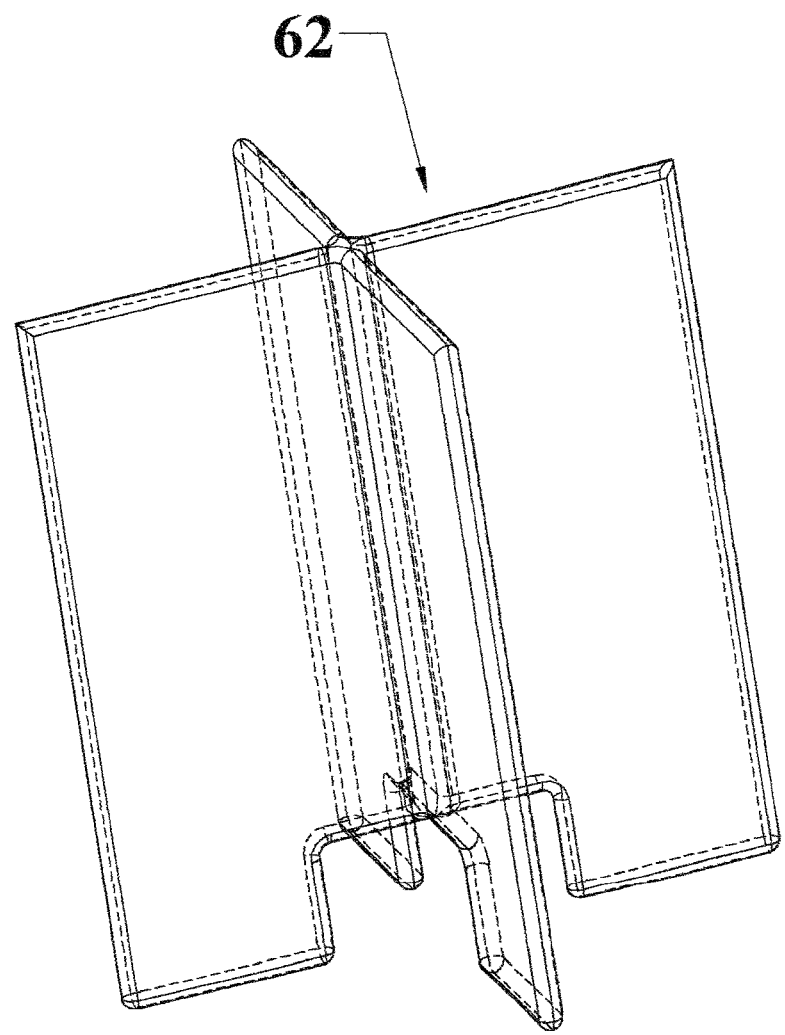

FIG. 15 is an isometric view of an optional insert for the bottom box shown in FIG. 7.

Figure 16:
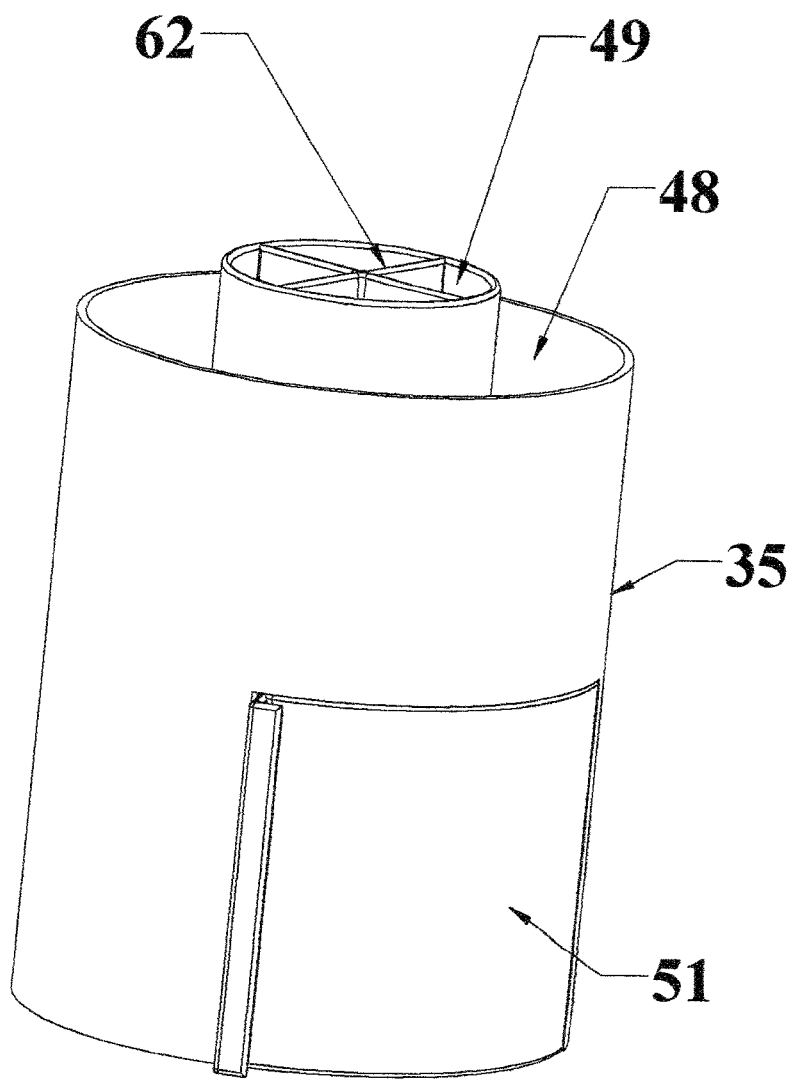

FIG. 16 is an isometric view which illustrates the use of the optional insert shown in FIG. 15 for the top box shown in FIG. 7.

Figure 17:
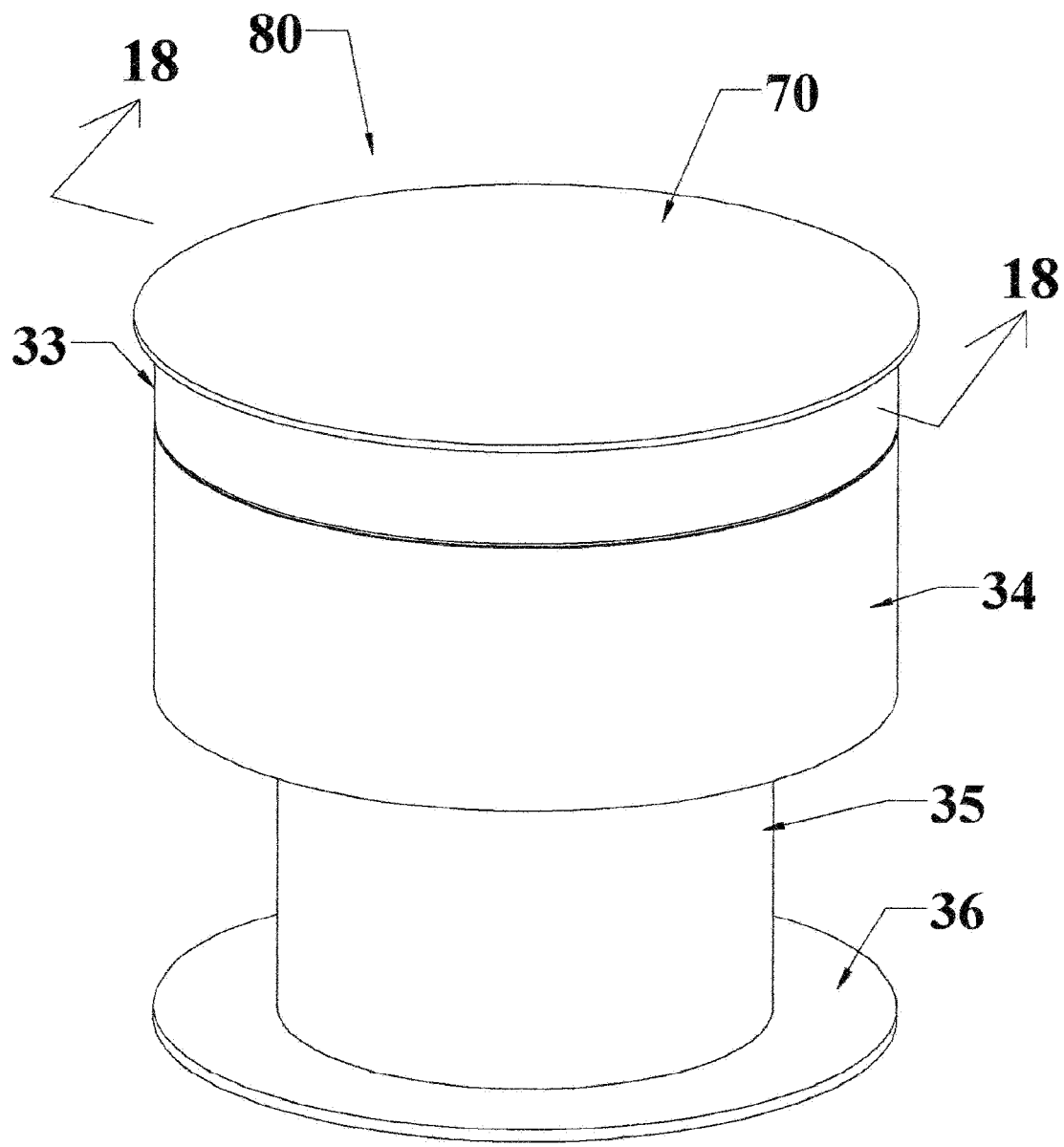

FIG. 17 is an isometric view of another variations of the invented device. No hidden lines are shown.

Figure 18:
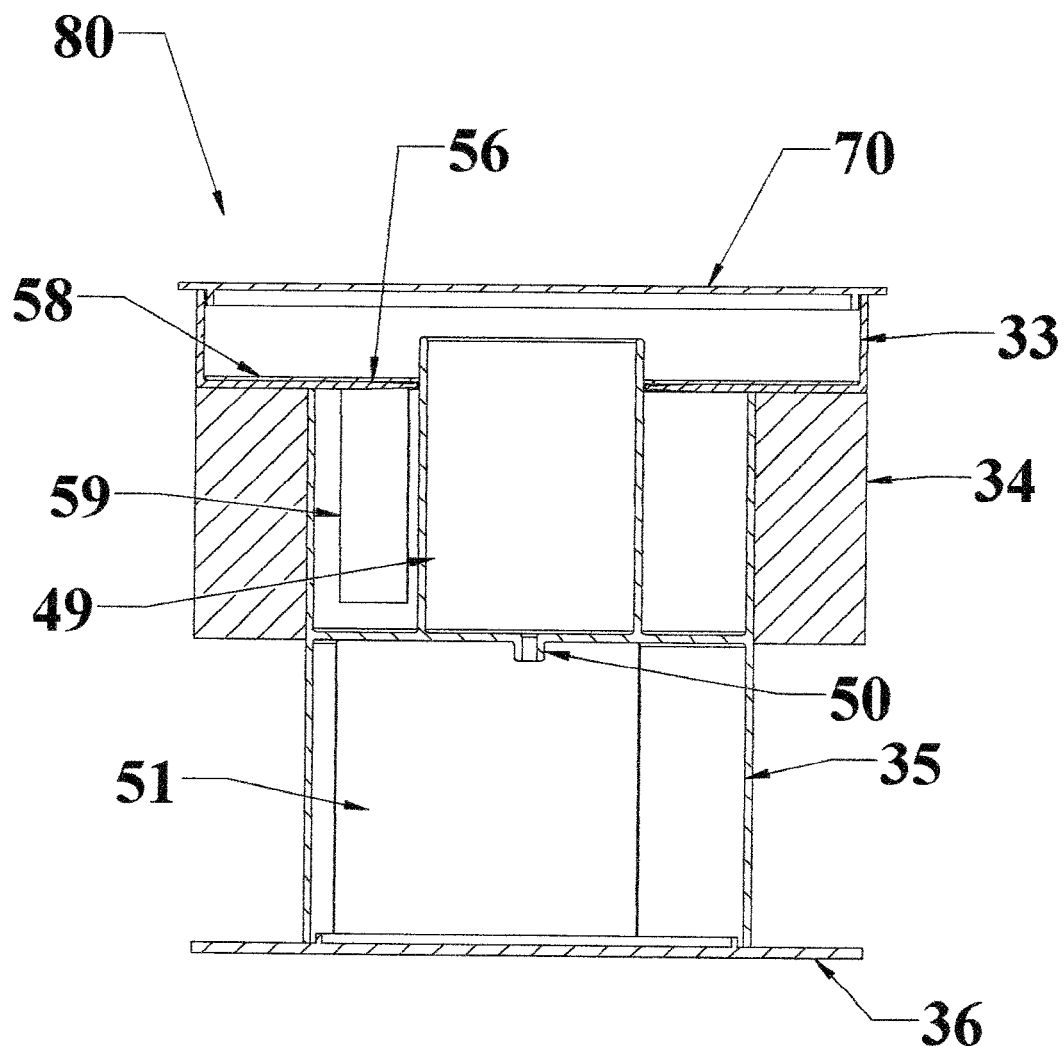

FIG. 18 is a cross-sectional view of the invented device shown in FIG. 17. No hidden lines are shown.

Figure 19:
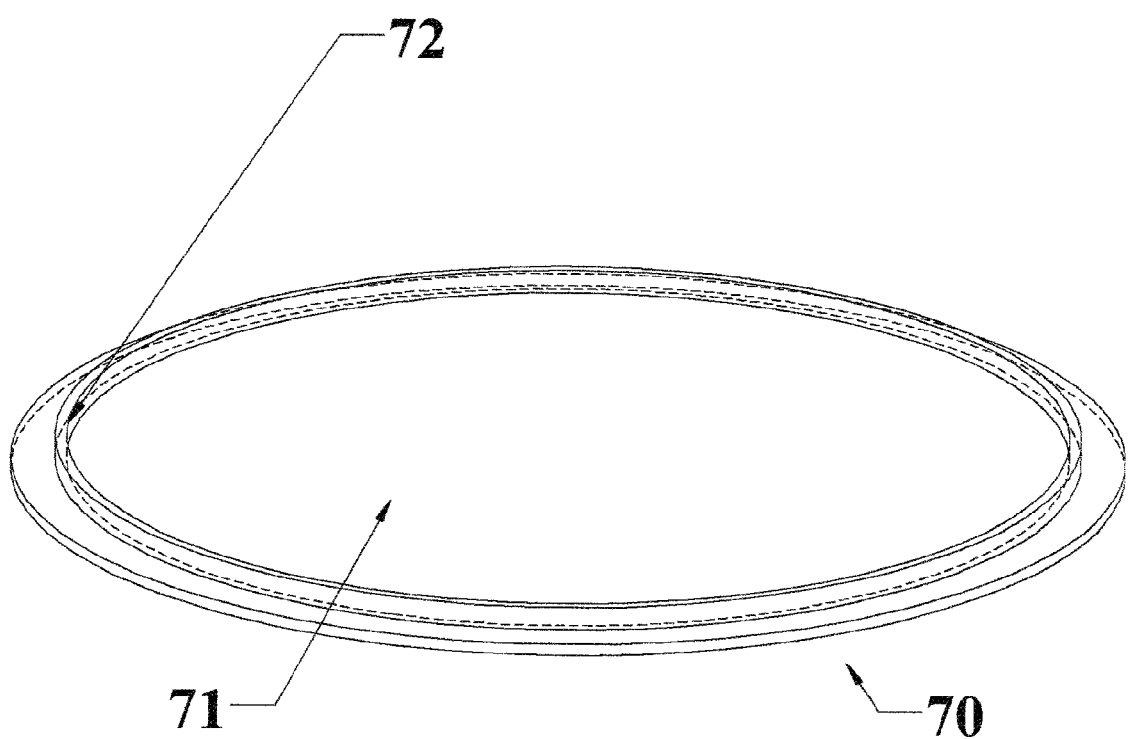

FIG. 19 is an isometric view of the transparent cover of the invented device shown in FIG. 17.

Figure 20:
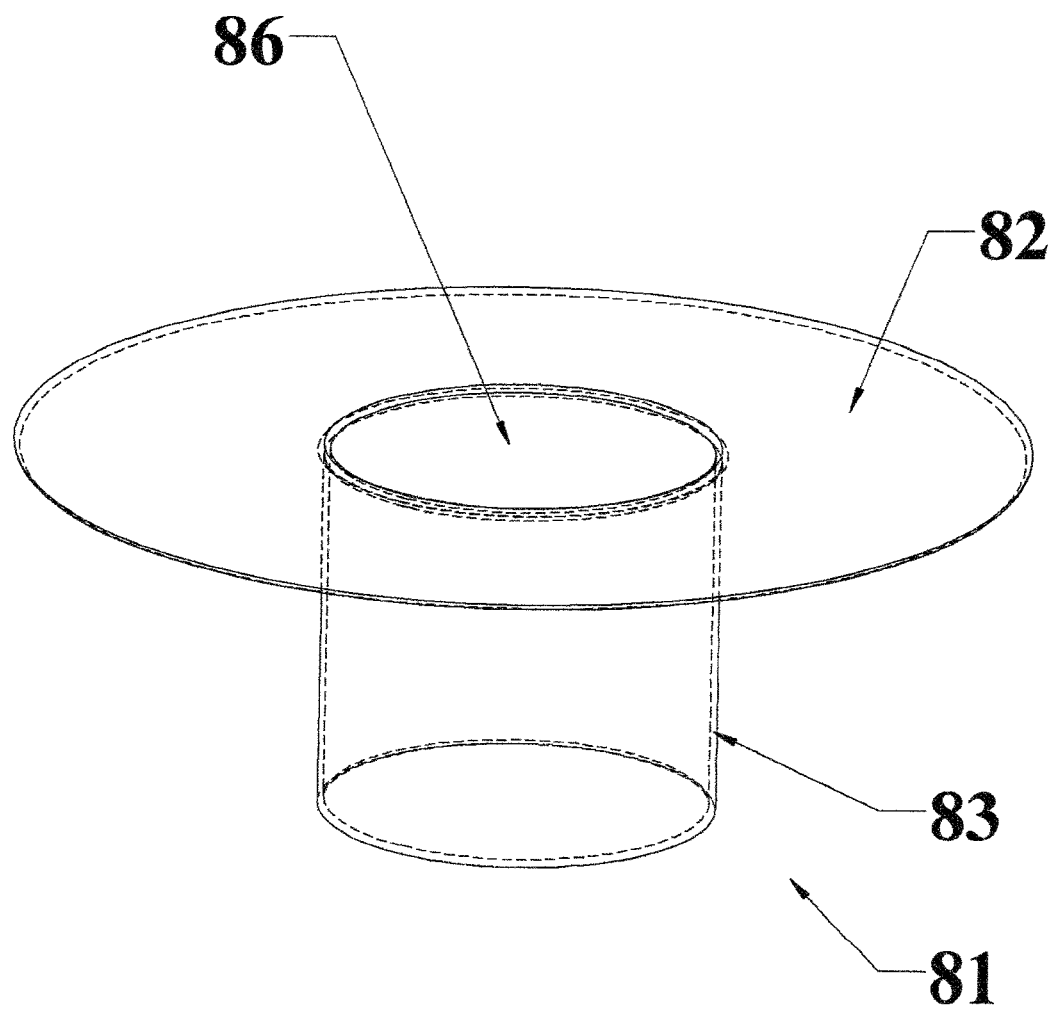

FIG. 20 is an isometric view of a variation of the water supplier, a component of the invented device.

Figure 21:
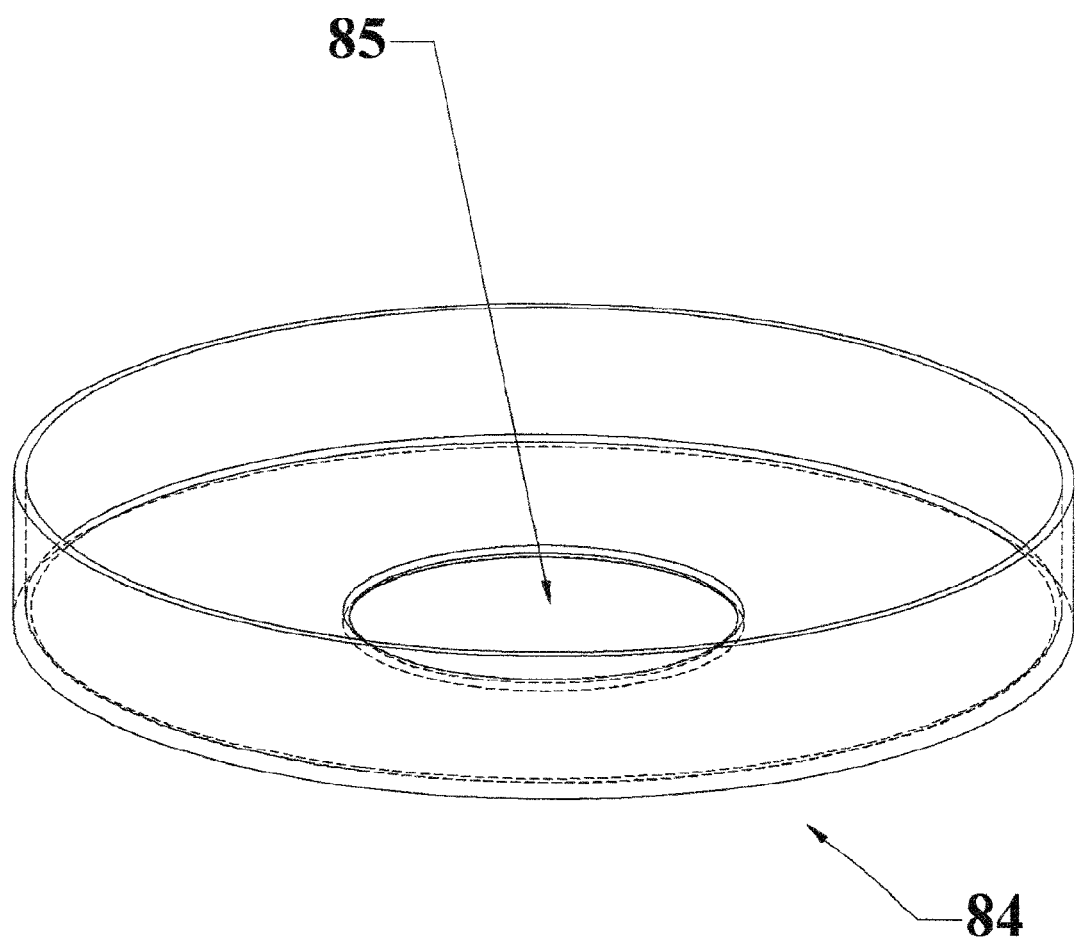

FIG. 21 is an isometric view of a variation of the top box, a component of the invented device. The hidden lines are not shown.

Figure 22:
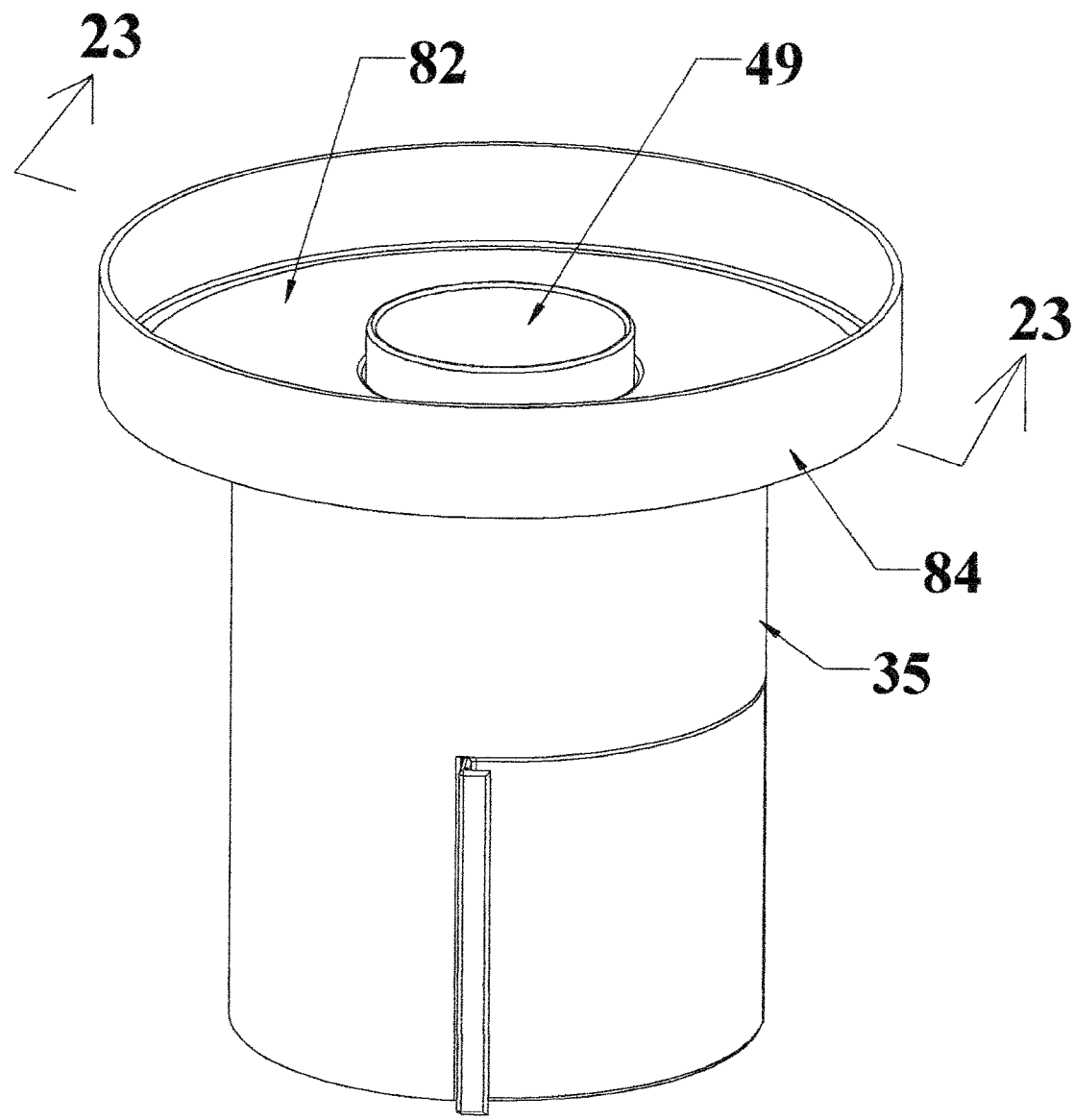

FIG. 22 is an assembled isometric view of a variation of the water supplier, the top box, and the bottom box shown in FIG. 20, FIG. 21 and FIG. 7. The hidden lines are not shown.

Figure 23:
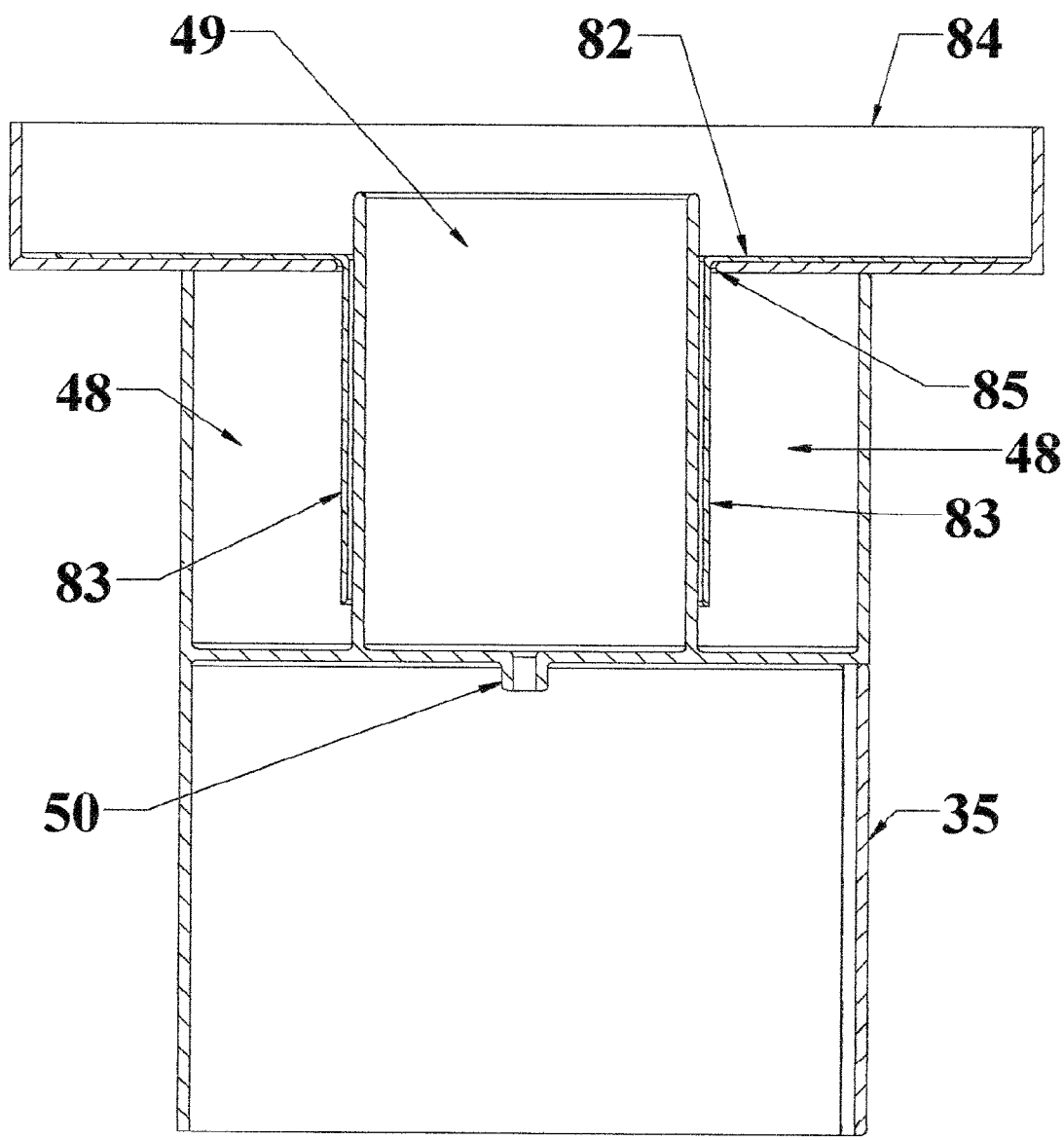

FIG. 23 is a cross-sectional view of the assembly shown in FIG. 22. No hidden lines are shown.

DETAILED DESCRIPTION OF THE INVENTION

Referring to FIG. 1 through FIG. 11, the first variation of the invented water vapor collector bottles 1 consists of a transparent dome 31, a dome water collector 32, a top box 33, a water supplier 56, an optional insulator 34, a bottom box 35 and an optional bottom cover 36. The transparent dome is made of a transparent material which allows sun ray to penetrate. There will be a dome knocker mount 38 on top of the dome 31 when the dome knocker 37 is used. The dome knocker mount has a dome knocker mount shaft 39 which is an extruding object from the dome. The dome knocker mount shaft has an enlarged end. The dome knocker 37 consists of a knocker hammer 41, a knocker mounting ring 40 and a knocker wind deflector 42. The knocker wind deflector 42 is a thin plate which one end connects to the knocker mounting ring which is a ring that has a larger center hole than that of the dome knocker mount shaft 39 but smaller than that of the enlarged end of the dome knocker mount shaft. The knocker wind deflector has a flip-up portion 44 which can deflect and change wind's direction when the wind blows across the knocker wind deflector. The knocker wind deflector has a knocker wind direction guide 43 which is a thin plate extruding upwards from the thin plate of the knocker wind deflector. Opposite to the knocker wind deflector connecting to the knocker mounting ring is the knocker hammer 41 which is an elongated object with an enlarged end. The knocker will be mounted on the dome with the knocker mount shaft through the knocking mounting ring. Due to the differences on diameters and sizes of the knocker mount shaft, its enlarged end and the knocking mounting ring, the knocker will be able to move and turn on the knocker mount shaft. The dome water collector 32 is a relatively flat ring with a water collection channel 52 and a water outlet 53, depressed areas close to the center of the flat ring. The top box 33 is a chamber with a center opening 55 and at least one other opening, the water supply slot 54 (two openings are shown). The water supplier 56 has a water platform 58 on the top and at least one water raising leg 59 (two are shown) extruding from the water platform. There is an opening 57 on the water platform. The water supplier is made of water affinity material such as a cotton cloth which allows passing of waters by capillary actions and forces. The insulator 34 is made of high R-value material which can encase the bottom box. The bottom box 35 consists of two portions, the upper portion 46 and the lower portion 47. The upper portion has two chambers, the outer chamber 48 and the inner chamber 49. The rim of the inner chamber is higher than the rim of the outer chamber. The rim of the inner chamber can penetrate the center opening 55 of the top box and the opening 57 of the water supplier. The bottom of the inner chamber has an outlet 50 which is an opening. The lower portion's wall has a door 51. The bottom cover 36 is a plate which can be mounted onto the lower portion of the bottom box. The invented devices will be assembled such that the transparent dome is mounted on the outer edge of the water collection channel 52 of the dome water collector 32 which is placed on the rim of the top box 33. The top box is mounted on the rim of the outer chamber 48 of the bottom box 35 which is mounted on the optional bottom cover 36, when it is in use. The water platform of the water supplier 56 is placed on the top of the floor (or the bottom) of the top box 33 with the water raising leg 59 is placed through the water supply slot 54. The insulator 34 is mounted on the exterior surface of the upper portion of the bottom box.

Figure 1:
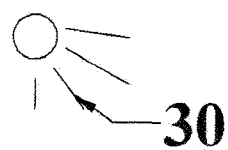
Figure 1:
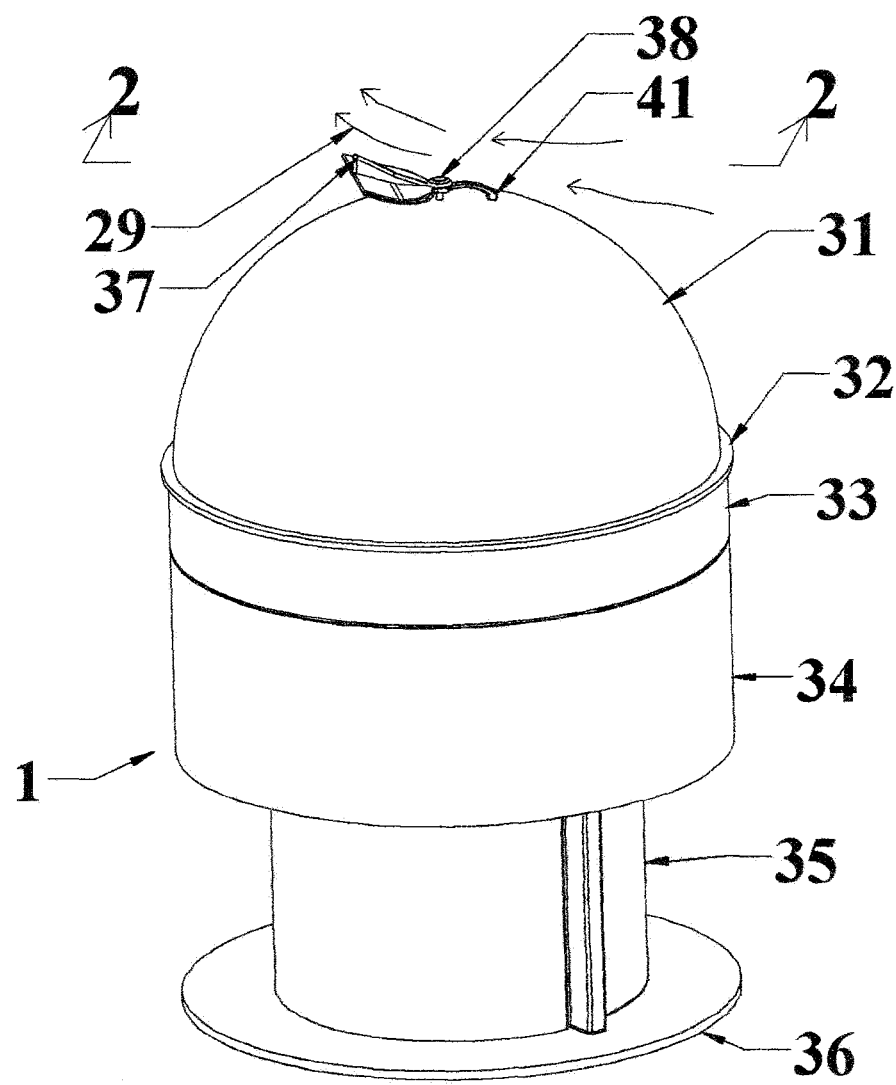
Figure 2:
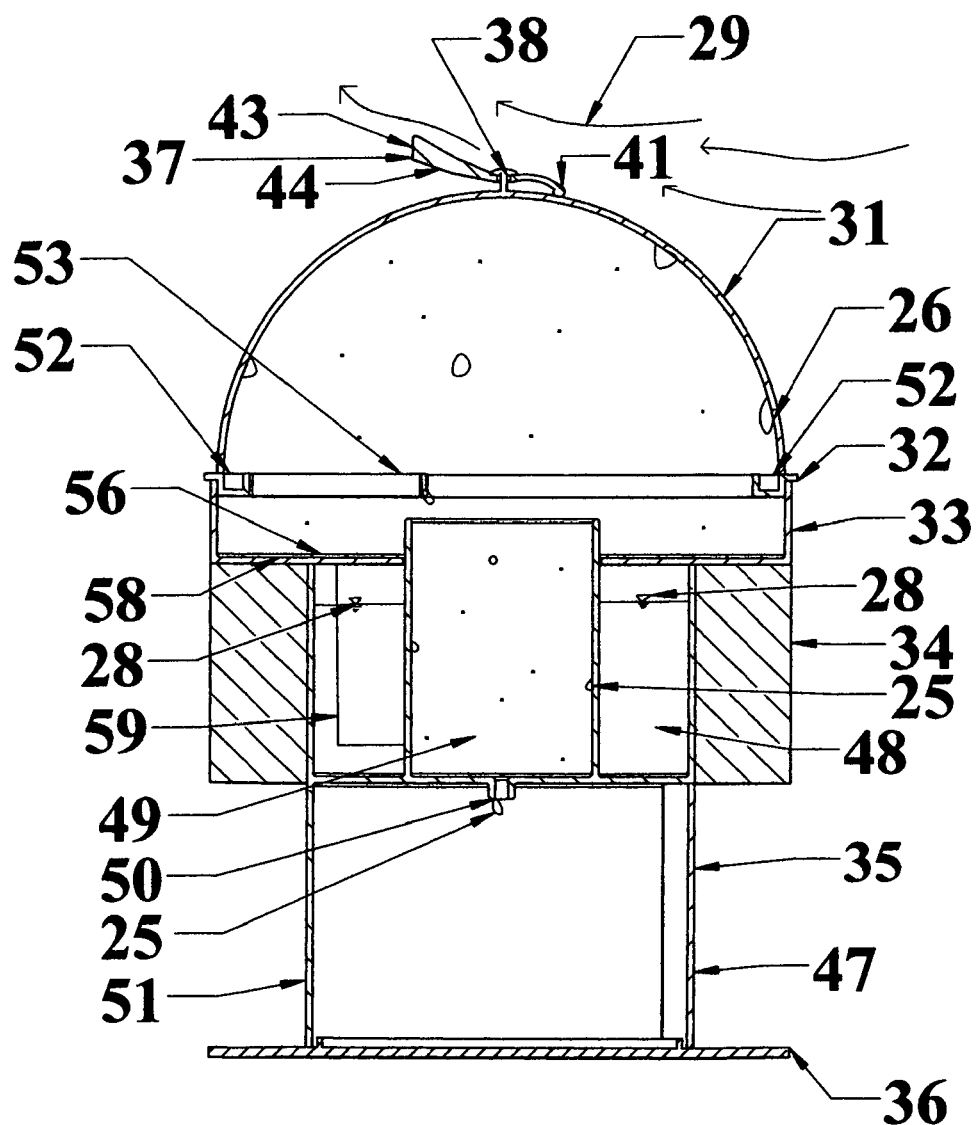

In using the invented devices, the user will firstly put the assembly under the sun. Then the user will remove the transparent dome and the dome water collector from the assembly. Then, the user will pour water into the top box. The poured water will drop through the water supply slot 54 into the outer chamber of the bottom box. The user may stop pouring water into the top box when the outer chamber is full (The outer chamber is full when the user sees the stagnated water in the top box). The user will open the door 51 of the lower portion of the bottom box to place a container under the outlet 50 of the bottom box to collect condensates. The user then closes the door and waits for the sun to do the work. FIG. 1 and FIG. 2 illustrate the functions of the invented device in detail. The sun rays 30 will penetrate the transparent dome to evaporate some of the water on the water supply platform 58 of the water supplier 56. The evaporated water vapor 27 will move around the spaces enclosed by the transparent dome 32, the dome water collector 32, the top box 33 and the inner chamber 49 of the bottom box 35. Some of the water vapor will touch the interior surfaces of the transparent dome and the inner chamber to form water condensate. When the water condensates 26 on the transparent dome become large enough, they will travel down along the interior surface of the transparent dome into the water collection channel 52 then through the water outlet 53 into the inner chamber 49 to join the water condensates 25 on the interior surface of the inner chamber. The water condensates will then flow through the outlet 50 into a container (not shown) below. The water raising leg 59 of the water supplier 56 will continuing upward water movement, by capillary forces, from water stored in the outer chamber 48 of the bottom box 35 to the water supply platform 58 to compensate the water removed by evaporation. The insulator 34 will keep the water in the outer chamber cool so the interior surface of the inner chamber maintains a low temperature to condense the water vapors. When the dome knocker 37 is used, the wind 29 will push the knocker wind direction guide 43 (also referring to FIG. 4) such that the knocker hammer 41 will point toward the wind direction. Meanwhile, the wind 29 will push downward the knocker wind deflector 42 by gusting through the flip up portion 44. Then the knocker hammer will be raise up from the exterior surface of the transparent dome. When the wind gust is over and the pushing force by the wind gust over the flip up portion 44 is gone, the knocker hammer will drop back to the surface of the transparent dome to create a knock. The knocks will be continued as long as the wind gusts exist. The knocks will help the condensate to drop down from the surfaces of the transparent dome and the condensate chamber. The water from the condensates in the container (not shown) may be taken away for uses through the door 51 of the bottom box 35.

The vapor condensate rates depend on the areas of the contact surfaces. Based on this, several variations of the top box are also illustrated. FIG. 12 shows the inner chamber 60 with many surfaces. FIG. 13 shows the center opening 61 also has many surfaces in order to work conjugated with the inner chamber shown in FIG. 12. FIG. 14 shows the top box 33 shown in FIG. 13 is mounted on top of the bottom box 35 shown in FIG. 12. The areas of the contact surfaces can be enlarged by inserts in the condensate chambers. FIG. 15 shows an example of the insert. FIG. 16 shows the insert 62 is in the inner chamber 49 of the first variation of the invented bottom box. To increase the heat absorbing efficiency, the water supply platform of the water supplier may have dark color to attract heat for water vapor generation.

Referring to FIG. 17, FIG. 18 and FIG. 19, another variation of the invented water vapor collector bottle 80 consists of a transparent cover 70, a top box 33, a water supplier 56, an optional insulator 34, a bottom box 35 and an optional bottom cover 36. The transparent cover is made of a transparent material which allows sun ray to penetrate. The transparent cover has a ledge 72 which facilitates the mounting of itself to the remaining parts of the invented devices. The top box 33, the water supplier 56, the optional insulator 34, the bottom box 35 and the optional bottom cover 36 are the same as those described for the first variation of the invented devices. The construction and uses of this additional variation of the invented water vapor collector bottle 80 are very similar to those of the first variation's and therefore will not be repeated herein.

Referring to FIG. 20 through FIG. 23, the variation of the top box 84 has only one center opening 85, without the water supply slot described in the first variation of the invented devices. The variation of the water supplier 81 has a water platform 82 on the top and at least one water raising leg 83 (a circular one is shown, but it could be made from segments of a circular one) extruding from the water platform. There is an opening 86 on the water platform. The water supplier is made from material with an affinity to water, such as a cotton cloth which allows passing of waters by capillary actions and forces. In assembly, the water platform is put on to bottom of the top box 84 while the water raising leg 83 penetrates the center opening 85 of the top box. The top box and the water supplier assembly will be mounted on top of the bottom box 35. The functions of the variations are similar to those described for the first variation of the invention.

The foregoing is considered as illustrative only of the principles of the invention. Furthermore, since numerous modifications and changes will readily occur to those skilled in the art, it is not desired to limit the invention to the exact construction and operation shown and described, and accordingly all suitable modifications and equivalents, may be resorted to, falling within the scope of the invention as claimed.

We claim:

1. A water vapor collector bottle comprising:
   a) a transparent cover, a top box, a water supplier, and a bottom box;
   b) said top box being a chamber with a center opening and an optional water supply slot in the bottom of the top box;
   c) said bottom box having an upper portion and a lower portion;
   d) said upper portion having an inner chamber and an outer chamber which has an outer rim;
   e) said inner chamber having a rim which is higher than said outer rim of said outer chamber;
   f) said inner chamber having an opening which is at the lowest area of said inner chamber;
   g) said lower portion being a chamber with a door;
   h) said water supplier having a platform with an extruding leg which both are made of water affinity material;
   i) said extruding leg being generally perpendicular to said platform;
   j) said platform having a center opening;
   k) said transparent cover being on top of said top box;
   l) said top box being on top of said bottom box wherein said to box being able to be removed for refilling water into the outer chamber of the upper portion of said bottom box;
   m) said platform of said water supplier being on the bottom of said top box;
   n) said extruding leg of said water supplier being extended into said outer chamber of said upper portion of said bottom box through said center opening or said optional water supply slot in the bottom of said top box;
   o) said rim of said inner chamber penetrating said center opening of said top box;
   p) there being a gap between said rim of said inner chamber and the bottom of said transparent cover.

2. A water vapor collector bottle of claim 1 wherein said transparent cover being a dome-shaped object which is mounted on a ring-liked plate which has a channel which outlet points towards the center of said ring-liked plate and wherein said ring-liked plate being mounted on top of said top box.

3. A water vapor collector bottle of claim 2 wherein said dome-shaped object having an extruding object on which mounts a ring of a wind operated knocking device comprises an elongate object optionally ended with a hammer-liked object and a thin plate having a flip up or curled portion on each side of said ring and wherein said wind operated knocking device being able to knock on said dome-shaped object.

4. A water vapor collector bottle of claim 1 wherein said top box includes said optional water supply slot.

5. A water vapor collector bottle of claim 4 wherein said water supply slot comprises plural water supply slots.

6. A water vapor collector bottle of claim 5 wherein said water supplier having a platform comprises plural extruding legs.

7. A water vapor collector bottle of claim 1 wherein said inner chamber having an insert which increases the surface areas of said inner chamber.

8. A water vapor collector bottle of claim 1 comprises an insulation ring which is made of insulation materials and which is on the exterior surface of said upper portion of said bottom box.

9. A water vapor collector bottle of claim 1 wherein said bottom box having a lower portion includes a bottom cover.

* * * * *